(12) United States Patent
Thakur et al.

(10) Patent No.: US 12,384,909 B2
(45) Date of Patent: Aug. 12, 2025

(54) POLYMER COMPOSITIONS WITH EXCELLENT ELECTRICAL AND MECHANICAL PROPERTIES

(71) Applicant: Dow Global Technologies LLC, Midland, MI (US)

(72) Inventors: Varun Thakur, Cham (CH); Xiaosong Wu, Sugar Land, TX (US); Colin Li Pi Shan, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 627 days.

(21) Appl. No.: 17/639,573

(22) PCT Filed: Sep. 21, 2020

(86) PCT No.: PCT/US2020/051869
§ 371 (c)(1),
(2) Date: Mar. 1, 2022

(87) PCT Pub. No.: WO2021/061578
PCT Pub. Date: Apr. 1, 2021

(65) Prior Publication Data
US 2022/0372266 A1    Nov. 24, 2022

Related U.S. Application Data

(60) Provisional application No. 62/904,940, filed on Sep. 24, 2019.

(51) Int. Cl.
C08L 23/16 (2006.01)
(52) U.S. Cl.
CPC .......... C08L 23/16 (2013.01); *C08L 2205/025* (2013.01)
(58) Field of Classification Search
CPC ............................ C08L 23/16; C08L 2205/025
USPC ...................................................... 523/213
See application file for complete search history.

(56) References Cited

FOREIGN PATENT DOCUMENTS

| CN | 103881244 | | 6/2014 |
|---|---|---|---|
| CN | 106566094 | A | 4/2017 |
| EP | 0990675 | A1 | 4/2000 |
| WO | 2007136494 | | 11/2007 |
| WO | 2011008837 | | 1/2011 |
| WO | 2013096573 | | 6/2013 |
| WO | 2014084893 | | 6/2014 |
| WO | 2017210195 | | 12/2017 |
| WO | 2017210201 | A1 | 12/2017 |
| WO | 2019112728 | A1 | 6/2019 |
| WO | 2019161013 | A1 | 8/2019 |
| WO | 2021061577 | A1 | 4/2021 |
| WO | 2021061580 | A1 | 4/2021 |

OTHER PUBLICATIONS

Chunyan "Plastic Forming Technology and Mold Design", 2018, p. 45.
Lai "Chinese Coal Measures Koalin (Soil) and Its Processing and Utilization", 2001, p. 202.
Oggermuller, "Vergleich Mineralischer Fullstoffe in Isolierenden Karosseriedichtprofilen," 2003, vol. 53 No. 1 p. 31-37.
Krmelova, "Evaluation of effect of white fillers on selected properties of EPDM blend," 2016, vol. 136, p. 336-340.
Polestar, "The Application of Mineral Science Polestar 200R in Rubber," 2017.
Polestar, "The Application of Mineral Science Polestar 200R Calcined Clay in EPDM Rubber," 2018.
Silfitz91, "Technical Data Sheet—Field of application: Elastomers," 2007.
PCT/US2020/051869, International Search Report and Written Opinion with a mailing date of Aug. 12, 2020.

*Primary Examiner* — David T Karst
(74) *Attorney, Agent, or Firm* — Karen L. Beckman

(57) ABSTRACT

A composition comprising the following: a) a first ethylene/alpha-olefin/non-conjugated polyene interpolymer that has a Mooney Viscosity ≥50; b) a second ethylene/alpha-olefin/non-conjugated polyene interpolymer that has a Mooney Viscosity <50; c) a calcined filler formed from a filler composition comprising a kaolinite.

11 Claims, No Drawings

POLYMER COMPOSITIONS WITH EXCELLENT ELECTRICAL AND MECHANICAL PROPERTIES

CROSS-REFERENCE TO RELATED APPLICATIONS

The present application claims benefit of priority to U.S. Application No. 62/904,940, filed on Sep. 24, 2019, which is incorporated herein by reference in its entirety.

BACKGROUND OF THE INVENTION

More stringent carbon emission regulations are driving automotive manufacturers to reduce the vehicle weight wherever possible. For instance, in Europe, the emissions target will decrease from "125 g $CO_2$ per km" to "95 g $CO_2$ per km," by 2020. In modern vehicles, steel door panels are being replaced by Aluminum/Magnesium (Al/Mg) alloys to achieve significant weight reductions. However, the change from steel to an Al/Mg alloy (or, Al and Mg alone) has a significant impact on the rubber sealing profiles used to seal, for example, door and window panels to other surface components. Such profiles need much higher electrical resistivity ($\geq 10^8 \Omega \cdot cm$) compared to traditional profiles (around $10^6 \Omega \cdot cm$).

Traditional profiles formed from EPDM-based elastomer compositions have high loadings of carbon black, which tend to aggregate to form conductive 3D-networks within the final rubber formulations. Thus, there is a need to reduce the amount of carbon black to reduce the conductivity of the rubber. An insulating white filler can be used to replace some of the carbon black. However, the use of a white filler can have an adverse effect on the rubber's mechanical properties, such as compression set and elasticity, and can create an increase in porosity in an extruded profile. An increase in white filler content and a decrease in carbon black content also affect the curing properties as well. There is a need for elastomer compositions that provide high volume resistivity and excellent mechanical properties, and which can form extruded profiles of good integrity and minimal or no porosity.

V. Krmelová et al., *Evaluation of Effect of White Fillers on Selected Properties of EPDM Blend*, Procedia Engineering, 136 (2016), 336-340, discloses EPDM compositions containing various white fillers. These blends exhibit relatively low volume resistivities ($\leq 3.48 \times 10^7 \Omega \cdot cm$, see Table 4), which are too low to meet the current need of "$\geq 10^8 \Omega \cdot cm$." U.S. Pat. No. 9,994,095 discloses a weather strip for an automobile. The weather strip design uses a non-electrically conductive material to help prevent the formation of an electric circuit, caused by the intrusion of snow or water (see Abstract). This patent discloses, in general, the use of a rubber material, such as an EPDM sponge or an EPDM solid rubber material.

Carbon black can be used to adjust the electrical resistance of the EPDM rubber (see column 6, lines 28-41).

POLESTAR 200R Product Guide (*The Application of Mineral Science, POLESTAR 200R in Rubber*, 2017), discloses a cable formulation containing, in part, VISTALON 4608 and POLESTAR 200R. Although the formulation shows a relatively high-volume resistivity ($1.3 \times 10^{14} \Omega \cdot cm$), the elongation at break is relatively low (240%). See also POLESTAR 200R Product Guide (*The Application of Mineral Science, Calcined Clay in EPDM Rubber*, 2018). H. Oggermüller, Gummi Fasern Kunststoffe, 56, 1, 2003, 31-37 (English Abstract), discloses EPDM formulations containing reduced levels of carbon black and different mineral fillers, selected from silica, calcium carbonate, talc and kaolin. This reference discloses that only the silica reinforced EPDM-formulations showed good extrusion and sufficient mechanical and electrical properties.

As discussed above, there remains a need for elastomer compositions for automotive parts, and which provide high volume resistivity and excellent mechanical properties, such as elongation and compression set, and provide good processability and curing properties. Such compositions should form good extruded profiles with minimal or no porosity. These needs have been met by the following invention.

SUMMARY OF THE INVENTION

A composition comprising the following:
a) a first ethylene/alpha-olefin/nonconjugated polyene interpolymer that has a Mooney Viscosity $\geq 50$;
b) a second ethylene/alpha-olefin/nonconjugated polyene interpolymer that has a Mooney Viscosity $< 50$;
c) a calcined filler formed from a filler composition comprising a kaolinite.

DETAILED DESCRIPTION OF THE INVENTION

Elastomeric compositions have been discovered that have excellent volume resistivity, excellent elongation and compression set, and have good rheological properties and cure properties. These compositions can be used to form extruded profiles with minimal or no porosity. As discussed above, the composition comprises the following:
a) a first ethylene/alpha-olefin/nonconjugated polyene interpolymer that has a Mooney Viscosity $\geq 50$;
b) a second ethylene/alpha-olefin/nonconjugated polyene interpolymer that has a Mooney Viscosity $< 50$;
c) a calcined filler formed from a filler composition comprising a kaolinite.

In one embodiment, or a combination of two or more embodiments, each described herein, the filler composition further comprises a silica.

In one embodiment, or a combination of two or more embodiments, each described herein, the calcined filler is surface treated with a composition comprising a mercaptosilane, an alkyl silane, a vinyl silane, an epoxy, or an amino silane.

In one embodiment, or a combination of two or more embodiments, each described herein, the weight ratio of the calcined filler to the composition is $\geq 0.10$, or $\geq 0.15$, or $\geq 0.20$, or $\geq 0.25$. In one embodiment, or a combination of two or more embodiments, each described herein, the weight ratio of the calcined filler to the composition is $\leq 0.50$, or $\leq 0.45$, or $\leq 0.40$, or $\leq 0.35$, or $\leq 0.30$.

In one embodiment, or a combination of two or more embodiments, each described herein, the weight ratio of the calcined filler to the sum of the first and second interpolymers is $\geq 0.80$, or $\geq 0.85$, or $\geq 0.90$, or $\geq 0.95$, or $\geq 1.00$, or $\geq 1.05$. In one embodiment, or a combination of two or more embodiments, each described herein, the weight ratio of the calcined filler to the sum of the first and second interpolymers is $\leq 1.35$, or $\leq 1.30$, or $\leq 1.25$, or $\leq 1.20$, or $\leq 1.15$, or $\leq 1.10$.

In one embodiment, or a combination of two or more embodiments, each described herein, the composition further comprises carbon black. In one embodiment, or a combination of two or more embodiments, each described herein, the weight ratio of the carbon black to the composition is ≥0.05, or ≥0.10, or ≥0.15, or ≥0.20. In one embodiment, or a combination of two or more embodiments, each described herein, the weight ratio of the carbon black to the composition is ≤0.50, or ≤0.45, or ≤0.40, or ≤0.35, or ≤0.30, or ≤0.25.

In one embodiment, or a combination of two or more embodiments, each described herein, the weight ratio of the carbon black to the sum of the first and second interpolymers is ≥0.40, or ≥0.45, or ≥0.50, or ≥0.55, or ≥0.60, or ≥0.65, or ≥0.70, or ≥0.75. In one embodiment, or a combination of two or more embodiments, each described herein, the weight ratio of the carbon black to the sum of the first and second interpolymers is ≤1.10, or ≤1.05, or ≤1.00, or ≤0.95, or ≤0.90, or ≤0.85, or ≤0.80.

In one embodiment, or a combination of two or more embodiments, each described herein, the weight ratio of the carbon black to the calcined filler is ≥0.40, or ≥0.45, or ≥0.50, or ≥0.55, or ≥0.60, or ≥0.65. In one embodiment, or a combination of two or more embodiments, each described herein, the weight ratio of the carbon black to the calcined filler is ≤1.00, or ≤0.95, or ≤0.90, or ≤0.85, or ≤0.80, or ≤0.75, or ≤0.70.

In one embodiment, or a combination of two or more embodiments, each described herein, the composition has a Mooney Viscosity (ML(1+4), 100° C.) ≥20, or ≥25, or ≥30, or ≥35, or ≥40. In one embodiment, or a combination of two or more embodiments, each described herein, the composition has a Mooney Viscosity (ML(1+4), 100° C.) ≤80, or ≤75, or ≤70, or ≤65, or ≤60, or ≤55, or ≤50.

In one embodiment, or a combination of two or more embodiments, each described herein, the composition has a Rheology Ratio (RR) ≥40, or ≥45, or ≥50, or ≥55, or ≥60. In one embodiment, or a combination of two or more embodiments, each described herein, the composition has a Rheology Ratio (RR) ≤95, or ≤90, or ≤85, or ≤80, ≤ or 75.

In one embodiment, or a combination of two or more embodiments, each described herein, the first interpolymer is a first EPDM. In one embodiment, or a combination of two or more embodiments, each described herein, the nonconjugated polyene of the first interpolymer is ENB. In a further embodiment, the ENB content of the first interpolymer is ≥5.5 wt %, or ≥6.0 wt %, or ≥6.5 wt %, or ≥7.0 wt %. In one embodiment, or a combination of two or more embodiments, each described herein, the ENB content of the first interpolymer is ≤9.5 wt %, or ≤9.0 wt %, or ≤8.5 wt %, or ≤8.0 wt %. Each wt % is based on the weight of the first interpolymer. It is understood that the ENB content is in polymerized form.

In one embodiment, or a combination of two or more embodiments, each described herein, the second interpolymer is a second EPDM. In one embodiment, or a combination of two or more embodiments, each described herein, the nonconjugated polyene of the second interpolymer is ENB. In a further embodiment, the ENB content of the second interpolymer is ≥3.0 wt %, or ≥3.5 wt %, or ≥4.0 wt %. In one embodiment, or a combination of two or more embodiments, each described herein, the ENB content of the second interpolymer is ≤6.5 wt %, or ≤6.0 wt %, or ≤5.5 wt %, or ≤5.0 wt %. Each wt % is based on the weight of the second interpolymer. It is understood that the ENB content is in polymerized form.

In one embodiment, or a combination of two or more embodiments, each described herein, the first interpolymer has a Mooney Viscosity (ML1+4 at 125° C.) ≥52, or ≥54, or ≥56, or ≥58, or ≥60, or ≥62, or ≥64. In one embodiment, or a combination of two or more embodiments, each described herein, the first interpolymer has a Mooney Viscosity (ML1+4 at 125° C.) ≤100, or ≤95, or ≤90, or ≤85, or ≤80, or ≤75, or ≤70.

In one embodiment, or a combination of two or more embodiments, each described herein, the second interpolymer has a Mooney Viscosity (ML1+4 at 125° C.) ≥5.0, or ≥10, or ≥15, or ≥20, or ≥25. In one embodiment, or a combination of two or more embodiments, each described herein, the second interpolymer has a Mooney Viscosity (ML1+4 at 125° C.) ≤48, or ≤46, or ≤44, or ≤42, or ≤40, or ≤38, or ≤36, or ≤34, or ≤32, or ≤30.

In one embodiment, or a combination of two or more embodiments, each described herein, the second interpolymer has a Mooney Viscosity (ML1+4 at 125° C.) ≥28, or ≥29, or ≥30. In one embodiment, or a combination of two or more embodiments, each described herein, the second interpolymer has a Mooney Viscosity (ML1+4 at 125° C.) <50, or ≤48, or ≤46, or ≤44, or ≤42, or ≤40, or ≤38, or ≤36, or ≤34, or ≤32.

In one embodiment, or a combination of two or more embodiments, each described herein, the second interpolymer has a Mooney Viscosity (ML1+4 at 125° C.) from 28 to <50, or from 29 to <50, or from 30 to <50.

In one embodiment, or a combination of two or more embodiments, each described herein, the second interpolymer has a Mooney Viscosity (ML1+4 at 125° C.) from 28 to 45, or from 28 to 40, or from 28 to 35.

In one embodiment, or a combination of two or more embodiments, each described herein, the first interpolymer has a number average molecular weight Mn ≥50,000 g/mol, or ≥55,000 g/mol, or ≥60,000 g/mol, or ≥65,000 g/mol, or ≥70,000 g/mol. In one embodiment, or a combination of two or more embodiments, each described herein, the first interpolymer has a number average molecular weight Mn ≤95,000 g/mol, or ≤90,000 g/mol, or ≤85,000 g/mol, or ≤80,000 g/mol, or ≤75,000 g/mol.

In one embodiment, or a combination of two or more embodiments, each described herein, the second interpolymer has a number average molecular weight Mn ≥20,000 g/mol, or ≥25,000 g/mol, or ≥30,000 g/mol, or ≥35,000 g/mol. In one embodiment, or a combination of two or more embodiments, each described herein, the second interpolymer has a number average molecular weight Mn ≤70,000 g/mol, or ≤65,000 g/mol, or ≤60,000 g/mol, or ≤55,000 g/mol, or ≤50,000 g/mol, or ≤45,000 g/mol, or ≤40,000 g/mol.

In one embodiment, or a combination of two or more embodiments, each described herein, the first interpolymer has a weight average molecular weight Mw ≥180,000 g/mol, or ≥190,000 g/mol, or ≥200,000 g/mol, or ≥210,000 g/mol. In one embodiment, or a combination of two or more embodiments, each described herein, the first interpolymer has a weight average molecular weight Mw ≤250,000 g/mol, or ≤240,000 g/mol, or ≤230,000 g/mol, or ≤220,000 g/mol.

In one embodiment, or a combination of two or more embodiments, each described herein, the second interpolymer has a weight average molecular weight Mw ≥70,000 g/mol, or ≥80,000 g/mol, or ≥90,000 g/mol, or ≥100,000 g/mol, or ≥110,000 g/mol. In one embodiment, or a combination of two or more embodiments, each described herein, the second interpolymer has a weight average molecular weight Mw ≤150,000 g/mol, or ≤140,000 g/mol, or ≤130,000 g/mol, or ≤120,000 g/mol.

In one embodiment, or a combination of two or more embodiments, each described herein, the first interpolymer has a molecular weight distribution MWD ≥2.60, or ≥2.65, or ≥2.70, or ≥2.75, or ≥2.80, or ≥2.85, or ≥2.90. In one embodiment, or a combination of two or more embodiments, each described herein, the first interpolymer has a molecular weight distribution MWD ≤3.30, or ≤3.25, or ≤3.20, or ≤3.15, or ≤3.10, or ≤3.05, or ≤3.00.

In one embodiment, or a combination of two or more embodiments, each described herein, the second interpolymer has a molecular weight distribution MWD ≥2.80, or ≥2.85, or ≥2.90, or ≥2.95, or ≥3.00, or ≥3.05, or ≥3.10. In one embodiment, or a combination of two or more embodiments, each described herein, the second interpolymer has a molecular weight distribution MWD ≤3.50, or ≤3.45, or ≤3.40, or ≤3.35, or ≤3.30, or ≤3.25, or ≤3.20.

In one embodiment, or a combination of two or more embodiments, each described herein, the composition has a ratio $\{[Mn]_{First\ Interpolymer}/[Mn]_{Second\ Interpolymer}\} \geq 1.50$, or ≥1.55, or ≥1.60, or ≥1.65, or ≥1.70, or ≥1.75, or ≥1.80, or ≥1.85, or ≥1.90. In one embodiment, or a combination of two or more embodiments, each described herein, the composition has a ratio $\{[Mn]_{First\ Interpolymer}/[Mn]_{Second\ Interpolymer}\} \leq 2.15$, or ≤2.10, or ≤2.05, or ≤2.00.

In one embodiment, or a combination of two or more embodiments, each described herein, the composition has a ratio $\{[Mw]_{First\ Interpolymer}/[Mw]_{Second\ Interpolymer}\} \geq 1.60$, or ≥1.65, or ≥1.70, or ≥1.75. In one embodiment, or a combination of two or more embodiments, each described herein, the composition has a ratio $\{[Mw]_{First\ Interpolymer}/[Mw]_{Second\ Interpolymer}\} \leq 1.95$, or ≤1.90, or ≤1.85, or ≤1.80.

In one embodiment, or a combination of two or more embodiments, each described herein, the composition has a ratio $\{[MWD]_{First\ Interpolymer}/[MWD]_{Second\ Interpolymer}\} \geq 0.905$, or ≥0.910, or ≥0.915, or ≥0.920. In one embodiment, or a combination of two or more embodiments, each described herein, the composition has a ratio $\{[MWD]_{First\ Interpolymer}/[MWD]_{Second\ Interpolymer}\} \leq 0.945$, or ≤0.940, or ≤0.935, or ≤0.930.

In one embodiment, or a combination of two or more embodiments, each described herein, the first interpolymer has a Rheology Ratio (RR) ≥22, or ≥24, or ≥26, or ≥28, or ≥30. In one embodiment, or a combination of two or more embodiments, each described herein, the first interpolymer has a Rheology Ratio (RR) ≤46, or ≤44, or ≤42, or ≤40, or ≤38, or ≤36.

In one embodiment, or a combination of two or more embodiments, each described herein, the second interpolymer has a Rheology Ratio (RR) ≥8, or ≥9, or ≥10, or ≥11, or ≥12. In one embodiment, or a combination of two or more embodiments, each described herein, the second interpolymer has a Rheology Ratio (RR) ≤30, or ≤28, or ≤26, or ≤24, or ≤22, or ≤20, or ≤18, or ≤16, or ≤14.

In one embodiment, or a combination of two or more embodiments, each described herein, the composition has a ratio $\{[RR]_{First\ Interpolymer}/[RR]_{Second\ Interpolymer}\} \geq 2.0$, or ≥2.1, or ≥2.2, or ≥2.3, or ≥2.4, or ≥2.5. In one embodiment, or a combination of two or more embodiments, each described herein, the composition has a ratio $\{[RR]_{First\ Interpolymer}/[RR]_{Second\ Interpolymer}\} \leq 3.0$, or ≤2.9, or ≤2.8, or ≤2.7, ≤ or 2.6.

In one embodiment, or a combination of two or more embodiments, each described herein, the composition has a Mooney Viscosity ratio $\{[MV]_{First\ Interpolymer}/[MV]_{Second\ Interpolymer}\} \geq 1.9$, or ≥2.0, or ≥2.1, or ≥2.2, or ≥2.3, or ≥2.4, or ≥2.5, or ≥2.6. In one embodiment, or a combination of two or more embodiments, each described herein, the composition has a ratio $\{[MV]_{First\ Interpolymer}/[MV]_{Second\ Interpolymer}\} \leq 3.2$, or ≤3.1, or ≤3.0, or ≤2.9, ≤ or 2.8, or ≤2.7.

In one embodiment, or a combination of two or more embodiments, each described herein, the first ethylene/alpha-olefin/nonconjugated polyene interpolymer or the second ethylene/alpha-olefin/nonconjugated polyene interpolymer each independently comprises 50 wt % or a majority amount of polymerized ethylene, based on the weight of the respective interpolymer. In a further embodiment, each interpolymer is independently an EPDM. In a further embodiment, each diene is ENB.

In one embodiment, or a combination of two or more embodiments, each described herein, the first ethylene/alpha-olefin/nonconjugated polyene interpolymer and the second ethylene/alpha-olefin/nonconjugated polyene interpolymer each independently comprises 50 wt % or a majority amount of polymerized ethylene, based on the weight of the respective interpolymer. In a further embodiment, each interpolymer is independently an EPDM. In a further embodiment, each diene is ENB.

In one embodiment, or a combination of two or more embodiments, each described herein, the composition comprises ≥20.0 wt %, or ≥22.0 wt %, or ≥24.0 wt %, or ≥26.0 wt %, of the sum of the first interpolymer and the second interpolymer, based on the weight of the composition. In one embodiment, or a combination of two or more embodiments, each described herein, the composition comprises ≤40.0 wt %, or ≤38.0 wt %, or ≤36.0 wt %, or ≤34.0 wt %, or ≤32.0 wt %, or ≤30.0 wt %, of the sum of the first interpolymer and the second interpolymer, based on the weight of the composition.

In one embodiment, or a combination of two or more embodiments, each described herein, the composition further comprises an oil. In one embodiment, or a combination of two or more embodiments, each described herein, the weight ratio of the oil to the compositions is ≥0.10, or ≥0.12, or ≥0.14, or ≥0.16, or ≥0.18. In one embodiment, or a combination of two or more embodiments, each described herein, the weight ratio of the oil to the compositions is ≤0.30, or ≤0.28, or ≤0.26, or ≤0.24, or ≤0.22, or ≤0.20.

In one embodiment, or a combination of two or more embodiments, each described herein, the composition further comprises a crosslinking agent. In a further embodiment, the crosslinking agent comprises sulfur, one or more activators, and/or one or more accelerators, and further sulfur. In one embodiment, or a combination of two or more embodiments, each described herein, the crosslinking agent is present in an amount from 0.5 phr to 18 phr, or from 5.0 phr to 18 phr, or from 12 phr to 18 phr, based on the 100 parts of the sum of the first and second interpolymers.

The invention also provides a crosslinked composition formed from the composition of any one embodiment, or a combination of two or more embodiments, each described herein.

In one embodiment, or a combination of two or more embodiments, each described herein, the composition has a Volume Resistivity ≥1×10$^9$ ohm·cm, or ≥1×10$^{10}$ ohm·cm, or ≥1×10$^{11}$ ohm·cm. In a further embodiment, the composition has a Volume Resistivity ≤1×10$^{15}$ ohm·cm.

In one embodiment, or a combination of two or more embodiments, each described herein, the composition has an Elongation at Break ≥400%, or ≥420%, or ≥440%, or ≥460%, or ≥480%, or ≥500%, or ≥520%, or ≥540%, or ≥560%, or ≥580%.

In one embodiment, or a combination of two or more embodiments, each described herein, the composition has an Elongation at Break ≥600%, or ≥610%, or ≥620%, or ≥630%, or ≥640%, or ≥650%, or ≥660%, or ≥670%.

In one embodiment, or a combination of two or more embodiments, each described herein, the composition has a Shore A Hardness ≥57, or ≥58, or ≥59, or ≥60. In a further embodiment, the composition has a Shore A Hardness, ≤95.

In one embodiment, or a combination of two or more embodiments, each described herein, the composition has a Tensile Strength ≥7.4 MPa, or ≥7.5 MPa, or ≥7.6 MPa, or ≥7.7 MPa. In a further embodiment, the composition has a Tensile Strength ≤16 MPa.

The invention also provides an article comprising at least one component formed from the composition of any one embodiment, or a combination of two or more embodiments, described herein. In one embodiment, or a combination of two or more embodiments, each described herein, the article is an automotive part. In one embodiment, or a combination of two or more embodiments, each described herein, the article is an extruded article (for example, an extruded profile), an injected molded article, or a thermoformed article, and further an extruded article (for example, an extruded profile).

In one embodiment, or a combination of two or more embodiments, each described herein, the article is selected from a weather strip, a hose (for example, an automotive hose), a belt (for example, an automotive belt), a building material, a roofing membrane, a wire or cable jacket, a flooring material, a computer part, a gasket, or a tire.

The inventive composition may comprise a combination of two or more embodiments, as described herein. The first ethylene/alpha-olefin/non-conjugated polyene interpolymer (first interpolymer) may comprise a combination of two or more embodiments, as described herein. The second ethylene/alpha-olefin/non-conjugated polyene interpolymer (second interpolymer) may comprise a combination of two or more embodiments, as described herein.

Ethylene/Alpha-Olefin/Nonconjugated Polyene Interpolymers

The first and second ethylene/alpha-olefin/nonconjugated polyene interpolymers, each as described herein, independently comprises, in polymerize form, ethylene, an alpha-olefin, and a nonconjugated polyene. The alpha-olefin may be either an aliphatic or an aromatic compound. The alpha-olefin is preferably a C3-C20 aliphatic compound, preferably a C3-C16 aliphatic compound, and more preferably a C3-C10 aliphatic compound. Preferred C3-C10 aliphatic alpha-olefins include propylene, 1-butene, 1-hexene, 1-octene and 1-decene, and more preferably propylene. In one embodiment, or a combination of two or more embodiments, each described herein, each interpolymer is independently an ethylene/propylene/nonconjugated diene terpolymer. In a further embodiment, each diene is ENB.

Suitable examples of nonconjugated polyenes include the C4-C40 nonconjugated dienes. Illustrative nonconjugated polyenes include straight chain acyclic dienes, such as 1,4-hexadiene and 1,5-heptadiene; branched chain acyclic dienes, such as 5-methyl-1,4-hexadiene, 2-methyl-1,5-hexadiene, 6-methyl-1,5-heptadiene, 7-methyl-1,6-octadiene, 3,7-dimethyl-1,6-octadiene, 3,7-dimethyl-1,7-octadiene, 5,7-dimethyl-1,7-octadiene, 1,9-deca-diene, and mixed isomers of dihydromyrcene; single ring alicyclic dienes such as 1,4-cyclo-hexadiene, 1,5-cyclooctadiene and 1,5-cyclododecadiene; multi-ring alicyclic fused and bridged ring dienes, such as tetrahydroindene, methyl tetrahydroindene; alkenyl, alkylidene, cycloalkenyl and cycloalkylidene norbornenes such as 5-methylene-2-norbornene (MNB), 5-ethylidene-2-norbornene (ENB), 5-vinyl-2-norbornene (VNB), 5-propenyl-2-norbornene, 5-isopropylidene-2-norbornene, 5-(4-cyclopentenyl)-2-norbornene, and 5-cyclohexylidene-2-norbornene. The polyene is preferably a nonconjugated diene selected from the group consisting of ENB, VNB, dicyclopentadiene, 1,4-hexadiene, 7-methyl-1,6-octadiene, and preferably, ENB, VNB, dicyclopentadiene and 1,4-hexadiene, more preferably ENB, VNB and dicyclopentadiene, and even more preferably ENB.

Crosslinking Agents, Oils and Other Additives

Crosslinking agents include, but are not limited to, sulfur-containing compounds, such as elemental sulfur, 4,4'-dithiodimorpholine, thiuram di- and polysulfides, alkylphenol disulfides, and 2-morpholino-dithiobenzothiazole; and peroxides, such as di-tertbutyl peroxide, tert-butylcumyl peroxide, dicumyl peroxide, 2,5-dimethyl-2,5-di-(tertbutylperoxy) hexane, di-(tertbutylperoxyisopropyl) benzene, tertbutyl peroxybenzoate, and 1,1-di-(tertbutylperoxy)-3,3,5-trimethylcyclohexane. Sulfur can be a crystalline elemental sulfur or an amorphous elemental sulfur, and either type can be in pure form or supported on an inert carrier. An example of a supported sulfur is RHENOGRAN S-80 (80% S and 20% inert carrier) from Rhein Chemie. The sulfur containing compounds are the preferred crosslinking agents.

Oils include, but are not limited to, paraffinic oils, naphthenic oils and polyalkyl-benzene oils. In one embodiment, or a combination of two or more embodiments, each described herein, the oil is selected from the group consisting of nonaromatic oils, paraffinic oils, naphthenic oils, and combinations thereof. Suitable oils include, but are not limited to, SUNPAR 2280, PARALUX 6001, HYDROBRITE 550, and CALSOL 5550, and preferably SUNPAR 2280.

An inventive composition may comprise one or more additional additives. Suitable additives include, but are not limited to, fillers, stabilizers (for example, antioxidants, antiozonants, UV stabilizers), flame retardants, colorants or pigments, and combinations thereof. Fillers include, but are not limited to, calcined fillers (for example, see Table 1 below); carbon black (for example, SPHERON 6000A, SPHERON 5000A, SPHERON 6400A, and THERMAX N-990); silicates of aluminum, magnesium, calcium; titanium dioxide; natural fibers; synthetic fibers; and the like. An inventive composition preferably comprises at least one calcined filler and carbon black. Some stabilizers include, but are not limited to, hindered phenols, bisphenols, thiobisphenols, and substituted hydroquinones. Typically, one or more stabilizers, in "ppm" amounts, are added to a polymer or a polymer composition. Calcium oxide may be used as desiccant, typically in amounts from 4 phr to 10 phr, based on 100 parts of the polymer component(s) (for example, the first and second interpolymers). Useful process aids include fatty acids, Zn/Ca and Zn-free containing fatty acids.

In one embodiment, or a combination of two or more embodiments, each described herein, an inventive composition further comprises a thermoplastic polymer, different, independently, from each of the first and second interpolymers, in one or more features, such as monomer(s) types and/or amounts, Mn, Mw, Mz, MWD, Mooney Viscosity, V0.1, V100, RR, or any combination thereof. Polymers include, but not limited to, ethylene-based polymers, propylene-base polymers, and olefin multi-block interpolymers. Suitable ethylene-base polymers include, but are not limited to, high density polyethylene (HDPE), linear low density polyethylene (LLDPE), very low density polyethylene (VLDPE), ultra-low density polyethylene (ULDPE), homogeneously branched linear ethylene-based polymers, and homogeneously branched substantially linear ethylene-based polymers (that is homogeneously branched, long chain branched ethylene polymers). Suitable propylene-base polymers include, but are not limited to, polypropylene homopolymers and propylene/ethylene copolymers.

Definitions

Unless stated to the contrary, implicit from the context, or customary in the art, all parts and percents are based on weight, and all test methods are current as of the filing date of this disclosure.

The term "composition," as used herein, includes a mixture of materials, which comprise the composition, as well as reaction products and decomposition products formed from the materials of the composition. Any reaction product or decomposition product is typically present in trace or residual amounts.

The term "polymer," as used herein, refers to a polymeric compound prepared by polymerizing monomers, whether of the same or a different type. The generic term polymer thus includes the term homopolymer (employed to refer to polymers prepared from only one type of monomer, with the understanding that trace amounts of impurities can be incorporated into the polymer structure), and the term interpolymer as defined hereinafter. Trace amounts of impurities, such as catalyst residues, can be incorporated into and/or within the polymer.

The term "interpolymer," as used herein, refers to polymers prepared by the polymerization of at least two different types of monomers. The term interpolymer thus includes the term copolymer (employed to refer to polymers prepared from two different types of monomers) and polymers prepared from more than two different types of monomers.

The term "propylene-based polymer," as used herein, refers to a polymer that comprises, in polymerized form, a majority weight percent of propylene (based on the weight of the polymer), and optionally may comprise one or more comonomers.

The term "ethylene-based polymer," as used herein, refers to a polymer that comprises, in polymerized form, 50 wt % or a majority weight percent of ethylene (based on the weight of the polymer), and optionally may comprise one or more comonomers.

The term "ethylene/alpha-olefin/nonconjugated polyene interpolymer," as used herein, refers to an interpolymer that comprises, in polymerized form, ethylene, an alpha-olefin, and a nonconjugated polyene. In one embodiment, the "ethylene/alpha-olefin/nonconjugated polyene interpolymer," comprises, in polymerized form, 50 wt % or a majority weight percent of ethylene (based on the weight of the interpolymer). The term "ethylene/a-olefin/nonconjugated diene interpolymer," as used herein, refers to an interpolymer that comprises, in polymerized form, ethylene, an alpha-olefin, and a nonconjugated diene. In one embodiment, the "ethylene/alpha-olefin/nonconjugated diene interpolymer," comprises, in polymerized form, 50 wt % or a majority weight percent of ethylene (based on the weight of the interpolymer).

The term, "ethylene/alpha-olefin copolymer," as used herein, refers to a copolymer that comprises, in polymerized form, 50 wt % or a majority amount of ethylene monomer (based on the weight of the copolymer), and an alpha-olefin, as the only two monomer types.

The term "calcined," as used herein, in reference to fillers, refers to the heat treatment of a filler, which treatment takes place at a temperature ≥600° C., and typically up to a temperature ≤1050° C. Such a heat treatment may take place in a furnace. The filler may be heated so to oxidize, remove moisture, and/or reduce to a loose state (calx), but not to melt. Typically, the calcination process removes the crystallization water and crystallinity of a hydrous material.

The terms "comprising," "including," "having," and their derivatives, are not intended to exclude the presence of any additional component, step or procedure, whether the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure, not specifically delineated or listed.

Listing of Some Composition Features a) A composition comprising the following:
  a) a first ethylene/alpha-olefin/nonconjugated polyene interpolymer (first interpolymer) that has a Mooney Viscosity ≥50;
  b) a second ethylene/alpha-olefin/nonconjugated polyene interpolymer (second interpolymer) that has a Mooney Viscosity <50;
  c) a calcined filler formed from a filler composition comprising a kaolinite.

b) The composition of a) above, wherein the filler composition further comprises a silica.

c) The composition of a) or b) above, wherein the calcined filler is surface treated with a composition comprising a mercapto-silane, an alkyl silane, a vinyl silane, an epoxy, or an amino silane.

d) The composition of any one of a)-c) [a) through c)] above, wherein the calcined filler has one or more properties selected from the following: a d50 <4 microns; a volatile matter, at 105° C., ≤0.5 wt %, preferably ≤0.2 wt %; a surface area ≥6 m²/g; or a combination thereof.

e) The composition of any one of a)-d) above, wherein the weight ratio of the calcined filler to the composition is ≥0.10, or ≥0.15, or ≥0.20, or ≥0.25.

f) The composition of any one of a)-e) above, wherein the weight ratio of the calcined filler to the composition is ≤0.50, or ≤0.45, or ≤0.40, or ≤0.35, or ≤0.30.

g) The composition of any one of a)-f) above, wherein the weight ratio of the calcined filler to the sum of the first and second interpolymers is ≥0.80, or ≥0.85, or ≥0.90, or ≥0.95, or ≥1.00, or ≥1.05.

h) The composition of any one of a)-g) above, wherein the weight ratio of the calcined filler to the sum of the first and second interpolymers is ≤1.35, or ≤1.30, or ≤1.25, or ≤1.20, or ≤1.15, or ≤1.10.

i) The composition of any one of a)-h) above, wherein the composition further comprises carbon black.

j) The composition of i) above, wherein the weight ratio of the carbon black to the composition is ≥0.05, or ≥0.10, or ≥0.15, or ≥0.20.

k) The composition of i) or j) above, wherein the weight ratio of the carbon black to the composition is ≤0.50, or ≤0.45, or ≤0.40, or ≤0.35, or ≤0.30, or ≤0.25.

l) The composition of any one of i)-k) above, wherein the weight ratio of the carbon black to the sum of the first and second interpolymers is ≥0.40, or ≥0.45, or ≥0.50, or ≥0.55, or ≥0.60, or ≥0.65, or ≥0.70, or ≥0.75.

m) The composition of any one of i)-l) above, wherein the weight ratio of the carbon black to the sum of the first and second interpolymers is ≤1.10, or ≤1.05, or ≤1.00, or ≤0.95, or ≤0.90, or ≤0.85, or ≤0.80.

n) The composition of any one of i)-m) above, wherein the weight ratio of the carbon black to the calcined filler is ≥0.40, or ≥0.45, or ≥0.50, or ≥0.55, or ≥0.60, or ≥0.65.

o) The composition of any one of i)-n) above, wherein the weight ratio of the carbon black to the calcined filler is ≤1.00, or ≤0.95, or ≤0.90, or ≤0.85, or ≤0.80, or ≤0.75, or ≤0.70.

p) The composition of any one of i)-o) above, wherein the carbon black has one or more properties selected from the following: an Oil Absorption Number (OAN) <100 mL/100 g, a STSA surface area <25 m$^2$/g, an Iodine Number ≤20 mg/g, or a combination thereof.

q) The composition of any one of a)-p) above, wherein the composition has a density ≥1.00 g/cc, or ≥1.05 g/cc, or ≥1.10 g/cc, or ≥1.15 g/cc, or ≥1.20 g/cc (1 cc=1 cm$^3$).

r) The composition of any one of a)-q) above, wherein the composition has a density ≤1.50 g/cc, or ≤1.45 g/cc, or ≤1.40 g/cc, or ≤1.35 g/cc, or ≤1.30 g/cc.

s) The composition of any one of a)-r) above, wherein the composition has a Mooney Viscosity (ML(1+4), 100° C.) ≥20, or ≥25, or ≥30, or ≥35, or ≥40.

t) The composition of any one of a)-s) above, wherein the composition has a Mooney Viscosity (ML(1+4), 100° C.) ≤80, or ≤75, or ≤70, or ≤65, or ≤60, or ≤55, or ≤50.

u) The composition of any one of a)-t) above, wherein the composition has a Rheology Ratio (RR) ≥40, or ≥45, or ≥50, or ≥55, or ≥60.

v) The composition of any one of a)-u) above, wherein the composition has a Rheology Ratio (RR) ≤95, or ≤90, or ≤85, or ≤80, ≤ or 75.

w) The composition of any one of a)-v) above, wherein the composition has a V0.1 (0.1 rad/s, 190° C.) ≥150,000 Pa·s, or ≥155,000 Pa·s, or ≥160,000 Pa·s, or ≥165,000 Pa·s, or ≥170,000 Pa·s, or ≥175,000 Pa·s.

x) The composition of any one of a)-w) above, wherein the composition has a V0.1 (0.1 rad/s, 190° C.) ≤230,000 Pa·s, or ≤225,000 Pa·s, or ≤220,000 Pa·s, or ≤215,000 Pa·s, ≤ or 210,000 Pa·s, or ≤205,000 Pa·s, or ≤200,000 Pa·s, ≤ or 195,000 Pa·s.

y) The composition of any one of a)-x) above, wherein the composition has a V100 (100 rad/s, 190° C.) ≥2,000 Pa·s, or ≥2,100 Pa·s, or ≥2,200 Pa·s, or ≥2,300 Pa·s, or ≥2,400 Pa·s, or ≥2,500 Pa·s, or ≥2,600 Pa·s.

z) The composition of any one of a)-y) above, wherein the composition has a V100 (100 rad/s, 190° C.) ≤3,600 Pa·s, or ≤3,500 Pa·s, or ≤3,400 Pa·s, or ≤3,300 Pa·s, ≤ or 3,200 Pa·s, or ≤3,100 Pa·s, or ≤3,000 Pa·s, ≤ or 2,900 Pa·s.

aa) The composition of any one of a)-z) above, wherein the composition comprises ≥12.0 wt %, or ≥14.0 wt %, or ≥16.0 wt %, or ≥18.0 wt % of the first ethylene/alpha-olefin/ nonconjugated polyene interpolymer (first interpolymer), based on the weight of the composition.

bb) The composition of any one of a)-aa) above, wherein the composition comprises ≤30.0 wt %, ≤28.0 wt %, or ≤26.0 wt %, or ≤24.0 wt %, or ≤22.0 wt %, or ≤20.0 wt % of the first interpolymer, based on the weight of the composition.

cc) The composition of any one of a)-bb) above, wherein the composition comprises ≥3.0 wt %, or ≥4.0 wt %, or ≥5.0 wt %, or ≥6.0 wt %, or ≥7.0 wt % of the second ethylene/ alpha-olefin/nonconjugated polyene interpolymer (second interpolymer), based on the weight of the composition.

dd) The composition of any one of a)-cc) above, wherein the composition comprises ≤12.0 wt %, ≤11.0 wt %, or ≤10.0 wt %, or ≤9.0 wt % of the second interpolymer, based on the weight of the composition.

ee) The composition of any one of a)-dd) above, wherein the first interpolymer is a first EPDM.

ff) The composition of any one of a)-ee) above, wherein the nonconjugated polyene of the first interpolymer is ENB.

gg) The composition of ff) above, wherein the ENB content of the first interpolymer is ≥5.5 wt %, or ≥6.0 wt %, or ≥6.5 wt %, or ≥7.0 wt %.

hh) The composition of ff) or gg) above, wherein the ENB content of the first interpolymer is ≤9.5 wt %, or ≤9.0 wt %, or ≤8.5 wt %, or ≤8.0 wt %. Each wt % is based on the weight of the first interpolymer. It is understood that the ENB content is in polymerized form.

ii) The composition of any one of a)-hh) above, wherein the second interpolymer is a second EPDM.

jj) The composition of any one of a)-ii) above, wherein the nonconjugated polyene of the second interpolymer is ENB.

kk) The composition of jj) above, wherein the ENB content of the second interpolymer is ≥3.0 wt %, or ≥3.5 wt %, or ≥4.0 wt %.

ll) The composition of jj) or kk) above, wherein the ENB content of the second interpolymer is ≤6.5 wt %, or ≤6.0 wt %, or ≤5.5 wt %, or ≤5.0 wt %. Each wt % is based on the weight of the second interpolymer. It is understood that the ENB content is in polymerized form.

mm) The composition of any one of a)-ll) above, wherein the C2 (ethylene) content of the first interpolymer is ≥40.0 wt %, or ≥42.0 wt %, or ≥44.0 wt %, or ≥46.0 wt %, or ≥48.0 wt %.

nn) The composition of any one of a)-mm) above, wherein the C2 (ethylene) content of the first interpolymer is ≤60.0 wt %, or ≤58.0 wt %, or ≤56.0 wt %, or ≤54.0 wt %, or ≤52.0 wt %. Each wt % is based on the weight of the first interpolymer. It is understood that the C2 (ethylene) content is in polymerized form.

oo) The composition of any one of a)-nn) above, wherein the C2 (ethylene) content of the second interpolymer is ≥60.0 wt %, or ≥62.0 wt %, or ≥64.0 wt %, or ≥66.0 wt %, or ≥68.0 wt %, or ≥70.0 wt %.

pp) The composition of any one of a)-oo) above, wherein the C2 (ethylene) content of the second interpolymer is ≤84.0 wt %, or ≤82.0 wt %, or ≤80.0 wt %, or ≤78.0 wt %, or ≤76.0 wt %, or ≤74.0 wt %. Each wt % is based on the weight of the second interpolymer. It is understood that the C2 (ethylene) content is in polymerized form.

qq) The composition of any one of a)-pp) above, wherein the first interpolymer has a Mooney Viscosity (ML1+4 at 125° C.) ≥52, or ≥54, or ≥56, or ≥58, or ≥60, or ≥62, or ≥64.

rr) The composition of any one of a)-qq) above, wherein the first interpolymer has a Mooney Viscosity (ML1+4 at 125° C.) ≤100, or ≤95, or ≤90, or ≤85, or ≤80, or ≤75, or ≤70.

ss) The composition of any one of a)-rr) above, wherein the second interpolymer has a Mooney Viscosity (ML1+4 at 125° C.) ≥5.0, or ≥10, or ≥15, or ≥20, or ≥25, or ≥30.

tt) The composition of any one of a)-ss) above, wherein the second interpolymer has a Mooney Viscosity (ML1+4 at 125° C.) ≤48, or ≤46, or ≤44, or ≤42, or ≤40, or ≤38, or ≤36, or ≤34, or ≤32.

uu) The composition of any one of a)-tt) above, wherein the second interpolymer has a Mooney Viscosity (ML1+4 at 125° C.) ≥28, or ≥29, or ≥30.

vv) The composition of any one of a)-uu) above, wherein the second interpolymer has a Mooney Viscosity (ML1+4 at 125° C.) <50, or ≤48, or ≤46, or ≤44, or ≤42, or ≤40, or ≤38, or ≤36, or ≤34, or ≤32.

ww) The composition of any one of a)-vv) above, wherein the second interpolymer has a Mooney Viscosity (ML1+4 at 125° C.) from 28 to <50, or from 29 to <50, or from 30 to <50.

xx) The composition of any one of a)-ww) above, wherein the second interpolymer has a Mooney Viscosity (ML1+4 at 125° C.) from 28 to 45, or from 28 to 40, or from 28 to 35.

yy) The composition of any one of a)-xx) above, wherein the first interpolymer has a number average molecular weight Mn ≥50,000 g/mol, or ≥55,000 g/mol, or ≥60,000 g/mol, or ≥65,000 g/mol, or ≥70,000 g/mol.

zz) The composition of any one of a)-yy) above, wherein the first interpolymer has a number average molecular weight Mn ≤95,000 g/mol, or ≤90,000 g/mol, or ≤85,000 g/mol, or ≤80,000 g/mol, or ≤75,000 g/mol.

a3) The composition of any one of a)-zz) above, wherein the second interpolymer has a number average molecular weight Mn ≥20,000 g/mol, or ≥25,000 g/mol, or ≥30,000 g/mol, or ≥35,000 g/mol.

b3) The composition of any one of a)-a3) above, wherein the second interpolymer has a number average molecular weight Mn ≤70,000 g/mol, or ≤65,000 g/mol, or ≤60,000 g/mol, or ≤55,000 g/mol, or ≤50,000 g/mol, or ≤45,000 g/mol, or ≤40,000 g/mol.

c3) The composition of any one of a)-b3) above, wherein the first interpolymer has a weight average molecular weight Mw ≥180,000 g/mol, or ≥190,000 g/mol, or ≥200,000 g/mol, or ≥210,000 g/mol.

d3) The composition of any one of a)-c3) above, wherein the first interpolymer has a weight average molecular weight Mw ≤250,000 g/mol, or ≤240,000 g/mol, or ≤230,000 g/mol, or ≤220,000 g/mol.

e3) The composition of any one of a)-d3) above, wherein the second interpolymer has a weight average molecular weight Mw ≥70,000 g/mol, or ≥80,000 g/mol, or ≥90,000 g/mol, or ≥100,000 g/mol, or ≥110,000 g/mol.

f3) The composition of any one of a)-e3) above, wherein the second interpolymer has a weight average molecular weight Mw ≤150,000 g/mol, or ≤140,000 g/mol, or ≤130,000 g/mol, or ≤120,000 g/mol.

g3) The composition of any one of a)-f3) above, wherein the first interpolymer has a molecular weight distribution MWD ≥2.60, or ≥2.65, or ≥2.70, or ≥2.75, or ≥2.80, or ≥2.85, or ≥2.90.

h3) The composition of any one of a)-g3) above, wherein the first interpolymer has a molecular weight distribution MWD ≤3.30, or ≤3.25, or ≤3.20, or ≤3.15, or ≤3.10, or ≤3.05, or ≤3.00.

i3) The composition of any one of a)-h3) above, wherein the second interpolymer has a molecular weight distribution MWD ≥2.80, or ≥2.85, or ≥2.90, or ≥2.95, or ≥3.00, or ≥3.05, or ≥3.10.

j3) The composition of any one of a)-i3) above, wherein the second interpolymer has a molecular weight distribution MWD ≤3.50, or ≤3.45, or ≤3.40, or ≤3.35, or ≤3.30, or ≤3.25, or ≤3.20.

k3) The composition of any one of a)-j3) above, wherein the composition has a ratio $\{[Mn]_{First\ Interpolymer}/[Mn]_{Second\ Interpolymer}\} \geq 1.75$, or ≥1.80, or ≥1.85, or ≥1.90.

l3) The composition of any one of a)-k3) above, wherein the composition has a ratio $\{[Mn]_{First\ Interpolymer}/[Mn]_{Second\ Interpolymer}\} \leq 2.15$, or ≤2.10, or ≤2.05, or ≤2.00.

m3) The composition of any one of a)-l3) above, wherein the composition has a ratio $\{[Mw]_{First\ Interpolymer}/[Mw]_{Second\ Interpolymer}\} \geq 1.60$, or ≥1.65, or ≥1.70, or ≥1.75.

n3) The composition of any one of a)-m3) above, wherein the composition has a ratio $\{[Mw]_{First\ Interpolymer}/[Mw]_{Second\ Interpolymer}\} \leq 1.95$, or ≤1.90, or ≤1.85, or ≤1.80.

o3) The composition of any one of a)-n3) above, wherein the composition has a ratio $\{[MWD]_{First\ Interpolymer}/[MWD]_{Second\ Interpolymer}\} \geq 0.905$, or ≥0.910, or ≥0.915, or ≥0.920.

p3) The composition of any one of a)-o3) above, wherein the composition has a ratio $\{[MWD]_{First\ Interpolymer}/[MWD]_{Second\ Interpolymer}\} \leq 0.945$, or ≤0.940, or ≤0.935, or ≤0.930.

q3) The composition of any one of a)-p3) above, wherein the first interpolymer has a Rheology Ratio (RR) ≥22, or ≥24, or ≥26, or ≥28, or ≥30.

r3) The composition of any one of a)-q3) above, wherein the first interpolymer has a Rheology Ratio (RR) ≤46, or ≤44, or ≤42, or ≤40, or ≤38, or ≤36.

s3) The composition of any one of a)-r3) above, wherein the second interpolymer has a Rheology Ratio (RR) ≥8, or ≥9, or ≥10, or ≥11, or ≥12.

t3) The composition of any one of a)-s3) above, wherein the second interpolymer has a Rheology Ratio (RR) ≤30, or ≤28, or ≤26, or ≤24, or ≤22, or ≤20, or ≤18, or ≤16, or ≤14.

u3) The composition of any one of a)-t3) above, wherein the composition has a ratio $\{[RR]_{First\ Interpolymer}/[RR]_{Second\ Interpolymer}\} \geq 2.0$, or ≥2.1, or ≥2.2, or ≥2.3, or ≥2.4, or ≥2.5.

v3) The composition of any one of a)-u3) above, wherein the composition has a ratio $\{[RR]_{First\ Interpolymer}/[RR]_{Second\ Interpolymer}\} \leq 3.0$, or ≤2.9, or ≤2.8, or ≤2.7, ≤ or 2.6.

w3) The composition of any one of a)-v3) above, wherein the composition has a Mooney Viscosity ratio $\{[MV]_{First\ Interpolymer}/[MV]_{Second\ Interpolymer}\} \geq 1.9$, or ≥2.0, or ≥2.1, or ≥2.2, or ≥2.3, or ≥2.4, or ≥2.5, or ≥2.6.

x3) The composition of any one of a)-w3) above, wherein the composition has a ratio $\{[MV]_{First\ Interpolymer}/[MV]_{Second\ Interpolymer}\} \leq 3.2$, or ≤3.1, or ≤3.0, or ≤2.9, ≤ or 2.8, or ≤2.7.

y3) The composition of any one of a)-x3) above, wherein the first ethylene/alpha-olefin/nonconjugated polyene interpolymer or the second ethylene/alpha-olefin/non-conjugated polyene interpolymer each independently comprises 50 wt % or a majority amount of polymerized ethylene, based on the weight of the respective interpolymer.

z3) The composition of y3) above, wherein each interpolymer is independently an EPDM, and further each diene is ENB.

a4) The composition of any one of a)-z3) above, wherein the first ethylene/alpha-olefin/nonconjugated polyene interpolymer and the second ethylene/alpha-olefin/non-conjugated polyene interpolymer each independently comprises 50 wt % or a majority amount of polymerized ethylene, based on the weight of the respective interpolymer.

b4) The composition of a4) above, wherein each interpolymer is independently an EPDM, and further each diene is ENB.

c4) The composition of any one of a)-b4) above, wherein the composition comprises ≥20.0 wt %, or ≥22.0 wt %, or ≥24.0 wt %, or ≥26.0 wt %, of the sum of the first interpolymer and the second interpolymer, based on the weight of the composition.

d4) The composition of any one of a)-c4) above, wherein the composition comprises ≤40.0 wt %, or ≤38.0 wt %, or ≤36.0 wt %, or ≤34.0 wt %, or ≤32.0 wt %, or ≤30.0 wt %, of the sum of the first interpolymer and the second interpolymer, based on the weight of the composition.

e4) The composition of any one of a)-d4) above, wherein the composition further comprises an oil.

f4) The composition of e4) above, wherein the weight ratio of the oil to the compositions is ≥0.10, or ≥0.12, or ≥0.14, or ≥0.16, or ≥0.18.

g4) The composition of e4) or f4) above, wherein the weight ratio of the oil to the compositions is ≤0.30, or ≤0.28, or ≤0.26, or ≤0.24, or ≤0.22, or ≤0.20.

h4) The composition of any one of a)-g4) above, wherein the composition further comprises a crosslinking agent.

i4) The composition of h4) above, wherein the crosslinking agent comprises sulfur, one or more activators, and/or one or more accelerators.

j4) The composition of i4) above, wherein crosslinking agent comprises sulfur.

k4) The composition of any one of h4)-j4) above, wherein the crosslinking agent is present in an amount from 0.5 phr to 18 phr, or from 5.0 phr to 18 phr, or from 12 phr to 18 phr, based on the 100 parts of the sum of the first and second interpolymers.

l4) A crosslinked composition formed from the composition of any one of a)-k4) above.

m4) The composition of any one of a)-l4) above, wherein the composition has a Volume Resistivity ≥1×10$^9$ ohm·cm, or ≥1×10$^{10}$ ohm·cm, or ≥1×10$^{11}$ ohm·cm.

n4) The composition of any one of a)-m4) above, wherein the composition has an Elongation at Break ≥400%, or ≥420%, or ≥440%, or ≥460%, or ≥480%, or ≥500%, or ≥520%, or ≥540%, or ≥560%, or ≥580%, or ≥600%, or ≥610%, or ≥620%, or ≥630%, or ≥640%, or ≥650%, or ≥660%, or ≥670%.

o4) The composition of any one of a)-n4) above, wherein the composition has a Compression Set (22 hours/23° C.) ≤13, or ≤12, or ≤11, or ≤10.

p4) The composition of any one of a)-o4) above, wherein the composition has a Compression Set (22 hours/70° C.) ≤17, or ≤16, or ≤15, or ≤14.

q4) The composition of any one of a)-p4) above, wherein the composition has a Compression Set (22 hours/100° C.) ≤32, or ≤31, or ≤30, or ≤29.

r4) The composition of any one of a)-q4) above, wherein the composition has a Shore A Hardness ≥57, or ≥58, or ≥59, or ≥60.

s4) The composition of any one of a)-r4) above, wherein the composition has a Trouser Tear Strength ≥8 N/m, or ≥9 N/m, or ≥10 N/m, or ≥11 N/m, or ≥12 N/m.

t4) The composition of any one of a)-s4) above, wherein the composition has a Tensile Strength ≥7.4 MPa, or ≥7.5 MPa, or ≥7.6 MPa, or ≥7.7 MPa.

u4) An article comprising at least one component formed from the composition of any one of a)-t4) above.

v4) The article of u4) above, wherein the article is an automotive part.

w4) The article of u4) or v4), wherein the article is an extruded article (for example, an extruded profile), an injected molded article, or a thermoformed article, and further an extruded article (for example, an extruded profile).

x4) The article of any one of u4)-w4) above, wherein the article is selected from a weather strip, a hose (for example, an automotive hose), a belt (for example, an automotive belt), a building material, a roofing membrane, a wire or cable jacket, a flooring material, a computer part, a gasket, or a tire.

Test Methods

Gel Permeation Chromatography

The chromatographic system consisted of a PolymerChar GPC-IR (Valencia, Spain) high temperature GPC chromatograph, equipped with an internal IR5 infra-red detector (IR5). The autosampler oven compartment was set at 160° Celsius, and the column compartment was set at 150° Celsius. The columns were four Agilent "Mixed A" 30 cm, 20-micron, linear mixed-bed columns, and a 20-micron pre-column. The chromatographic solvent was 1,2,4-trichlorobenzene, which contained "200 ppm of butylated hydroxytoluene (BHT)." The solvent source was nitrogen sparged. The injection volume was 200 microliters, and the flow rate was 1.0 milliliters/minute.

Calibration of the GPC column set was performed with "21 narrow molecular weight distribution polystyrene standards," with molecular weights ranging from 580 to 8,400,000 g/mol, and which were arranged in six "cocktail" mixtures, with at least a decade of separation between individual molecular weights. The standards were purchased from Agilent Technologies. The polystyrene standards were prepared at "0.025 grams in 50 milliliters of solvent" for molecular weights equal to, or greater than, 1,000,000 g/mol, and "0.05 grams in 50 milliliters of solvent" for molecular weights less than 1,000,000 g/mol. The polystyrene standards were dissolved at 80° Celsius, with gentle agitation, for 30 minutes. The polystyrene standard peak molecular weights were converted to polyethylene molecular weights using Equation 1 (as described in Williams and Ward, *J. Polym. Sci., Polym. Let.*, 6, 621 (1968)):

$$M_{polyethylene} = A \times (M_{polystyrene})^B \quad \text{(EQN. 1)},$$

where M is the molecular weight, A has a value of 0.4315 and B is equal to 1.0.

A fifth order polynomial was used to fit the respective polyethylene-equivalent calibration points. A small adjustment to A (from approximately 0.375 to 0.445) was made to correct for column resolution and band-broadening effects, such that linear homopolymer polyethylene standard is obtained at 120,000 Mw.

The total plate count of the GPC column set was performed with decane (prepared at "0.04 g in 50 milliliters of TCB," and dissolved for 20 minutes with gentle agitation.) The plate count (Equation 2) and symmetry (Equation 3) were measured on a "200 microliter injection," according to the following equations:

$$\text{Plate Count} = 5.54 * \left( \frac{(RV_{Peak\ Max})}{\text{Peak Width at } \frac{1}{2} \text{ height}} \right)^2 \quad \text{(EQN. 2)}$$

where RV is the retention volume in milliliters, the peak width is in milliliters, the peak max is the maximum height of the peak, and ½ height is ½ height of the peak maximum;

$$\text{Symmetry} = [(\text{Rear Peak } RV_{one\ tenth\ height} - RV_{Peak\ max})/(RV_{Peak\ max} - \text{Front Peak } RV_{one\ tenth\ height})] \quad \text{(EQN.3)},$$

where RV is the retention volume in milliliters, and the peak width is in milliliters, Peak max is the maximum position of the peak, one tenth height is 1/10 height of the peak maximum, and where rear peak refers to the peak tail at later retention volumes than the peak maximum, and where front peak refers to the peak front at earlier retention volumes than the peak max. The plate count for the chromatographic system should be greater than 18,000, and the symmetry should be between 0.98 and 1.22.

Samples were prepared in a semi-automatic manner with the PolymerChar "Instrument Control" Software, wherein the samples were weight-targeted at "2 mg/ml," and the solvent (contained 200 ppm BHT) was added to a pre nitrogen-sparged septa-capped vial, via the PolymerChar high temperature autosampler. The samples were dissolved for two hours at 160° C., under "low speed" shaking. The calculations of Mn(GPC), Mw(GPC), and Mz(GPC) were based on GPC results, using the internal IR5 detector (measurement channel) of the PolymerChar GPC-IR chromatograph, according to Equations 4-6, and using Polymer-Char GPCOne™ software, the baseline-subtracted IR chromatogram at each equally-spaced data collection point (i), and the polyethylene equivalent molecular weight obtained from the narrow standard calibration curve for the point (i) from Equation 1.

$$Mn_{(GPC)} = \frac{\sum_i IR_i}{\sum_i (IR_i/M_{polyethylene_i})},$$ (EQN. 4)

$$Mw_{(GPC)} = \frac{\sum_i (IR_i * M_{polyethylene_i})}{\sum_i IR_i},$$ (EQN. 5)

$$Mz_{(GPC)} = \frac{\sum_i (IR_i * M_{polyethylene_i}^2)}{\sum_i (IR_i * M_{polyethylene_i})}.$$ (EQN. 6)

In order to monitor the deviations over time, a flowrate marker (decane) was introduced into each sample, via a micropump, controlled with the PolymerChar GPC-IR system. This flowrate marker (FM) was used to linearly correct the pump flowrate (Flowrate(nominal)) for each sample, by RV alignment of the respective decane peak within the sample (RV(FM Sample)), to that of the decane peak within the narrow standards calibration (RV(FM Calibrated)). Any changes in the time of the decane marker peak were then assumed to be related to a linear shift in flowrate (Flowrate (effective)) for the entire run. To facilitate the highest accuracy of a RV measurement of the flow marker peak, a least-squares fitting routine was used to fit the peak of the flow marker concentration chromatogram to a quadratic equation. The first derivative of the quadratic equation was then used to solve for the true peak position. After calibrating the system, based on a flow marker peak, the effective flowrate (with respect to the narrow standards calibration) was calculated, as in Equation 7. Processing of the flow marker peak was done via the PolymerChar GPCOne™ Software. Acceptable flowrate correction is such that the effective flowrate should be within +/−1% of the nominal flowrate:

Flowrate(effective)=Flowrate(nominal)*(RV(FM Calibrated)/RV(FM Sample)) (EQN. 7).

Dynamic Mechanical Spectroscopy (DMS)

Small angle oscillatory shear was performed using a TA Instruments ARES, equipped with "25 mm parallel plates," under a nitrogen purge. The time between sample loading, and the beginning of the test, was set to five minutes for all samples. The experiments were performed at 190° C., over a frequency range of 0.1 to 100 rad/s. The strain amplitude was adjusted, based upon the response of the samples, from 1 to 3%. The stress response was analyzed in terms of amplitude and phase, from which the storage modulus (G'), loss modulus (G"), dynamic viscosity η*, and tan delta could be calculated. Specimens for Dynamic Mechanical Spectroscopy were "25 mm diameter×3.3 mm thick" compression molded discs, formed at 180° C., and 100 bars molding pressure, for five minutes, ambient atmosphere, and then quenched between chilled platens (15-20° C.) for two minutes. The Viscosities (V0.1, V100) and the rheology ratio (V0.1/V100 or RR), each at 190° C., were recorded.

Mooney Viscosity of Polymer Composition

Mooney viscosity (ML1+4) and Mooney stress relaxation (ML1+4+3) of each formulated polymer composition was recorded with an Alpha Technologies MV2000E Viscometer according to ASTM D1646, at 100° C. (large rotor). The preheating time was one minute, and the rotor operation time was four minutes. The viscosity of each formulated compositions was measured using an uncured sheet (see experimental section) of about 25 grams.

Mooney Viscosity of Polymer

Mooney Viscosity (ML1+4 at 125° C.) of each polymer (first interpolymer and second interpolymer) was measured in accordance with ASTM 1646, with a one minute preheat time and a "four minute" rotor operation time. The instrument was an Alpha Technologies Mooney Viscometer 2000. Sample size around 25 grams.

Cure Dynamics—MDR

Cure characteristics were measured using an Alpha Technologies Moving Die Rheometer (MDR) 2000 E, according to ASTM D5289, at 180° C., and with a 0.5 deg arc. The test period was 30 minutes. Each sample (6-8 grams) was cut from its respective uncured sheet (see experimental section). Reported values were ts2 (time to reach a "2 unit" increase in the torque from ML), t90 (time to reach 90% of the maximum cure), MH (maximum viscosity or maximum cure) and ML (minimum viscosity).

Mooney Scorch was measured according to ASTM D-1646, using an Alpha Technologies Mooney Viscometer 2000. The Mooney Viscometer was set at 125° C., and the Mooney Scorch values were reported for a small rotor, and represented the time to increase "x Mooney units (or torque units)" above the minimum viscosity (torque) (for example, t3 is the time needed to increase the viscosity "three torque units"). The total test time was 30 minutes, with a one minute preheat time. The viscosity of each composition was measured from the respective uncured sheet, which was cured in the viscometer, so that the scorch properties could be examined. Samples were conditioned for 24 hours at room temperature, prior to testing.

Tensile Strength

Tensile properties were measured according to ASTM D412 using a Zwick Roell Z010 device. Each dumbbell sample (type 5A) was cut from a compression molded (cured) plaque (t90+3 min, 180° C., 100 bars, ambient atmosphere, 2 mm thick plaque)—see experimental section. Here "t90" is the time for the sample to reach 90% of its maximum cure value, as determined by MDR. Tensile properties (tensile strength and elongation) were measured at room temperature, following the method ASTM D-412, in the machine direction, with a traverse speed of 500 mm/min.

Trouser Tear Strength (or Die-T Tear Strength)

Trouser Tear Strength was measured according to ASTM D624 type-T (Trouser Tear sample) on a Zwick Roell Z010 device, with a traverse speed of 100 mm/min. Test specimens were cut from compression molded (cured) plaques (t90+3 minutes, 180° C., 100 bars, ambient atmosphere, 2 mm thick plaque)—see experimental section.

Shore A Hardness

Shore A Hardness was measured according to ASTM D2240, using 3-layers of compression molded plaques (t90+3 minutes, 180° C., 100 bars, ambient atmosphere, (10 cm×10 cm×2 mm) plaque, 6 mm total thickness for three layers). See experimental section. Shore A hardness was measured on a Shore A Durometer Model 2000, made by INSTRON, with a Durometer Stand Model 902. This method permits hardness measurements, based on either initial indentation, or indentation after a specific time, or both. Here, the indentation was measured after at a specified time of three seconds.

Light Microscopy (Porosity)

The cross-section of a sample of an extruded profile (see experimental section) was examined with a "ZEISS STEMI 2000-C Stereo Light Microscope," operating with an incident light. A "ZEISS AXIOCAM ICc 1" digital color camera was used to obtain digital image of the sample. Each sample was prepared by cross-sectioning using a razor blade.

Density of Cured Polymer Composition

The density of each cured composition was determined according to the Archimedean principle (ASTM B962-17). Each test sample (approx. 10 grams) was cut from a compression molded (cured) plaque (t90+3 minutes, 180° C., 100 bars, ambient atmosphere, 2 mm thick plaque)—see experimental section. The test sample was dried and weighed, after immersion in isopropanol at room temperature.

Melt Index

The melt index (I2) of an ethylene-based polymer is measured in accordance with ASTM D-1238, condition 190° C./2.16 kg (melt index (I5) at 190° C./5.0 kg, melt index (I10) at 190° C./10.0 kg, high load melt index (I21) at 190° C./21.0 kg). The melt flow rate (MFR) of a propylene-based polymer is measured in accordance with ASTM D-1238, condition 230° C./2.16 kg.

Polymer Density

Polymer density is measured in accordance with ASTM D-297.

Volume Resistivity

A compression molded sheet of each formulated composition (t90+3 min, 180° C., 100 bars, ambient atmosphere, 2 mm thick plaque—see experimental section) was subject to volume resistivity measurements, according to DIN IEC 93. Sample dimensions were "10 cm×10 cm×2 mm." Measurements were taken after one minute, at an applied voltage of 10V.

FTIR Method for EPDM Composition Analysis

The EPDM terpolymers containing ethylene, propylene, and 5-ethylidene-2-norbornene were analyzed, using ASTM D3900 for ethylene content, and ASTM D6047 for ethylidene-norbornene content.

Compression Set

Compression set was measured according to ASTM D395 for 22 hours at 23° C., 70° C. and 100° C. Disks of "29 mm" in diameter and "2 mm" in thickness, were punched from compression molded plaques (180° C., 100 bars, t90+9 min, ambient atmosphere, 2 mm thickness). See experimental section. Each button sample was inspected for notches, uneven thickness and inhomogeneity, and selected buttons (without those defects) were tested. Compression set was performed on two specimens for each sample, at the temperatures specified, and the average result of the two specimens was reported. The button sample was placed in the compression device, having two metal plates that could be pressed together and locked into place at 25% of the original height of the button sample. The compression device, with the compressed samples, was then placed in an oven, and equilibrated at the appropriate temperature for a specified time (22 hours at 23° C., 70° C. or 100° C.). In this test, the stress was released at the test temperature, and the thickness of the sample was measured after a "30 minute" equilibration period at room temperature. Compression set is a measured of the degree of recovery of a sample following compression, and is calculated according to the equation $CS=(H0-H2)/(H0-H1)$; where H0 is the original thickness of the sample, H1 is the thickness of the spacer bar used, and H2 is the final thickness of the sample after removal of the compressive force.

EXPERIMENTAL

Polymers and Additives

The polymers and additives used in this study are listed below.

NORDEL EPDM 5565 with a Mooney Viscosity (ML1+4, 125° C.) of 65, a density of 0.86 g/cc, a mass percent ethylene (C2) of 50% (ASTM D3900), and a mass percent ENB of 7.5% (ASTM D6047). Available from the Dow Chemical Company.

NORDEL EPDM 4725P with a Mooney Viscosity (ML1+4, 125° C.) of 25, a density of 0.88 g/cc, a mass percent ethylene (C2) of 70% (ASTM D3900), and a mass percent ENB of 4.9% (ASTM D6047). Available from The Dow Chemical Company.

SPHERON 6000A carbon black available from Cabot Corporation.

SUNPAR 2280—Plasticizer/paraffinic oil, available from R. E. Carroll, Inc.

RHENOGRAN ZnO-70—Cure Activator, available from Rhein Chemie.

Stearic acid—Cure Activator and process aid, available from Loxiol.

RHENOGRAN CaO-80—Desiccant, available from Rhein Chemie.

CARBOWAX PEG 4000—Process aid (Polyethylene Glycol), available from The Dow Chemical Company.

STRUKTOL W33—Dispersant, available from Struktol.

RHENOGRAN RETARDER E-80—Cure Retarder, available from Rhein Chemie.

RHENOGRAN MBTS-70—Cure Accelerator, available from Rhein Chemie.

RHENOGRAN ZBEC-70—Cure Accelerator, available from Rhein Chemie.

RHENOGRAN TP-50—Cure Accelerator, available from Rhein Chemie.

RHENOGRAN CBS-80—Delayed Action Accelerator, available from Rhein Chemie.

RHENOGRAN CLD-80—Sulfur Donor, available from Rhein Chemie.

RHENOGRAN S-80—Curative, available from Rhein Chemie.

OMYA BSH—coated calcium carbonate available from Omya.

POLESTAR 200R—white filler available from Imerys Kaolin.

SILFIT Z91—white filler available from Hoffmann Mineral GmbH.

SILLITIN Z86—white filler available from Hoffmann Mineral GmbH.

AKTIFIT PF111—white filler available from Hoffmann Mineral GmbH.

AKTISIL PF216—white filler available from Hoffmann Mineral GmbH.

AKTISIL EM—white filler available from Hoffmann Mineral GmbH.

AKTIFIT AM—white filler available from Hoffmann Mineral GmbH.

Table 1 below provides further descriptions of the white fillers, and Table 2 below provides further descriptions of the polymers.

TABLE 1

White Fillers

| | White Filler | Characterisitcs | Volatile Matter at 105° C. | Base Structure |
|---|---|---|---|---|
| C1 | OMYA BSH* | surface treated CaCO$_3$ | — | CaCO$_3$ |
| I1 | POLESTAR 200R* | calcined & untreated | — | Kaolin** |
| C2 | SILLITIN Z86 | untreated | 0.5 wt % | Silica and kaolinite |
| I2 | SILFIT Z91 | calcined & untreated | 0.2 wt % | Silica and kaolinite |
| I3 | AKTIFIT PF111 | calcined & surface treated with alkyl silane | 0.1 wt % | Silica and kaolinite |
| C3 | AKTISIL PF216 | tetrasulfane silane suface treated | 0.3 wt % | Silica and kaolinite |
| C4 | AKTISIL EM | epoxy silane surface treated | 0.5 wt % | Silica and kaolinite |
| I4 | AKTIFIT AM | calcined & suface treated with amino silane | 0.2 wt % | Silica and kaolinite |

*Estimate the volatile matter (105° C.) at less than 0.5 wt %.
**Kaolin contains kaolinite.

TABLE 2

Property Data Polymers

| | | NORDEL 4725P (second interpolymer) | NORDEL 5565 (first interpolymer) |
|---|---|---|---|
| C2 | wt % | 70 | 50 |
| ENB | wt % | 4.9 | 7.5 |
| Mooney Viscosity (ML (1 + 4), 125° C.) | MU | 25 | 65 |
| Mn | g/mol | 37,439 | 71,776 |
| Mw | g/mol | 119,369 | 211,684 |
| MWD | g/mol | 3.19 | 2.95 |
| Rheology Ratio (RR) | | 13 | 33 |

Polymer Compositions

Formulated polymer compositions are listed in Table 3 below.

TABLE 3

Polymer Compositions (wt. parts)

| | Control | C1 | I1 | C2 | I2 | I3 | C3 | C4 | I4 |
|---|---|---|---|---|---|---|---|---|---|
| NORDEL 5565 | 70 | 70 | 70 | 70 | 70 | 70 | 70 | 70 | 70 |
| NORDEL 4725P | 30 | 30 | 30 | 30 | 30 | 30 | 30 | 30 | 30 |
| SPHERON 6000A | 130 | 75 | 75 | 75 | 75 | 75 | 75 | 75 | 75 |
| OMYACARB BSH | 0 | 110 | 0 | 0 | 0 | 0 | 0 | 0 | 0 |
| POLESTAR 200R | 0 | 0 | 110 | 0 | 0 | 0 | 0 | 0 | 0 |
| SILLITIN Z86 | 0 | 0 | 0 | 110 | 0 | 0 | 0 | 0 | 0 |
| SILFIT Z91 | 0 | 0 | 0 | 0 | 110 | 0 | 0 | 0 | 0 |
| AKTIFIT PF111 | 0 | 0 | 0 | 0 | 0 | 110 | 0 | 0 | 0 |
| AKTISIL PF216 | 0 | 0 | 0 | 0 | 0 | 0 | 110 | 0 | 0 |
| AKTISIL EM | 0 | 0 | 0 | 0 | 0 | 0 | 0 | 110 | 0 |
| AKTIFIT AM | 0 | 0 | 0 | 0 | 0 | 0 | 0 | 0 | 110 |
| SUNPAR 2280 | 70 | 70 | 70 | 70 | 70 | 70 | 70 | 70 | 70 |
| ZnO | 5 | 5 | 5 | 5 | 5 | 5 | 5 | 5 | 5 |
| Stearic Acid | 1 | 1 | 1 | 1 | 1 | 1 | 1 | 1 | 1 |
| CaO | 8 | 8 | 8 | 8 | 8 | 8 | 8 | 8 | 8 |
| PEG 4000 | 2.00 | 2.00 | 2.00 | 2.00 | 2.00 | 2.00 | 2.00 | 2.00 | 2.00 |
| STRUKTOL W33 | 2.00 | 2.00 | 2.00 | 2.00 | 2.00 | 2.00 | 2.00 | 2.00 | 2.00 |
| RETARDER E-80 | 0.50 | 0.50 | 0.50 | 0.50 | 0.50 | 0.50 | 0.50 | 0.50 | 0.50 |
| MBTS | 1.50 | 1.50 | 1.50 | 1.50 | 1.50 | 1.50 | 1.50 | 1.50 | 1.50 |
| ZBEC | 2.00 | 2.00 | 2.00 | 2.00 | 2.00 | 2.00 | 2.00 | 2.00 | 2.00 |
| TP-50 | 2.50 | 2.50 | 2.50 | 2.50 | 2.50 | 2.50 | 2.50 | 2.50 | 2.50 |

TABLE 3-continued

| Polymer Compositions (wt. parts) | | | | | | | | | |
|---|---|---|---|---|---|---|---|---|---|
| | Control | C1 | I1 | C2 | I2 | I3 | C3 | C4 | I4 |
| CBS-70 | 0.50 | 0.50 | 0.50 | 0.50 | 0.50 | 0.50 | 0.50 | 0.50 | 0.50 |
| CLD-80 | 1.00 | 1.00 | 1.00 | 1.00 | 1.00 | 1.00 | 1.00 | 1.00 | 1.00 |
| S-80 | 0.75 | 0.75 | 0.75 | 0.75 | 0.75 | 0.75 | 0.75 | 0.75 | 0.75 |
| Total | 326.75 | 381.75 | 381.75 | 381.75 | 381.75 | 381.75 | 381.75 | 381.75 | 381.75 |

Each composition (see Table 3) was mixed in a HARBURG FREUDENBERGER internal mixer, equipped with intermeshing rotors, using a standard "upside-down" ~ mixing procedure, and adding the first interpolymer (EPDM) and second interpolymer (EPDM) last, after the addition of all the additives. The "1.5 L net chamber" was filled to a filling level of 75%. The rotor speed was kept constant at 45 RPM during the mixing cycle. The feed temperature was 50° C., and the final composition was mixed for 200 seconds, or mixed until the drop temperature reached 110° C., whichever came first. The composition was then homogenized on a two roll mill (60° C.) for three minutes, and then sheeted to form an uncured sheet (2 mm thickness). The rheology properties of each formulated composition are shown in Table 4.

Garvey Die Extrusion—Extruded Profile

Garvey Die Extrusion was performed using a THERMO HAAKE POLYLAB System, associated with a HAAKE RHEOMEX 104. The barrel was heated to 80° C., and the extruder operated at a revolution speed of 50 RPM. Each formulated polymer composition was extruded through the ASTM Extrusion Garvey Die, according to ASTM D2230. The temperature of the die was set to 100° C. The extruded profiles were further cured in a hot air oven at 220° C. for five minutes.

Compression Molded Plaques

The mechanical properties (Hardness, Tensile, Tear, Compression Set) of the cured polymer compositions were measured from compression molded plaques. For each formulated composition, a sample of the uncured sheet (see above) was compression molded, in accordance to ASTM D3182, using a PHI (100-ton press). The desired mold (10 cm×10 cm×2 mm) was placed on a platen. The sample (uncured sheet) was cut slightly smaller than the dimensions of the individual mold cavity. The mill direction was marked, and the sample was labeled. The sample was placed in a preheated mold, taking care to place properly for mill direction. The platens were closed. The molding pressure was 100 bars, and the temperature was 180° C., ambient atmosphere. Cure times were specified, such as, for example, t90+3 minutes, where "t90" is the time for the sample to reach 90% of its maximum cure (MH), as determined by MDR. When the specified cure time ended, the bottom platen automatically opened. The sample was removed, and immediately placed in water to stop the curing. Samples were conditioned for 24 hours at room temperature, prior to testing.

Table 4 below shows the mechanical properties, cure properties, rheological properties, electrical properties and the porosity for each composition. It has been discovered the inventive compositions had high volume resistivity, low compression set, high elongation, and almost no porosity in the extruded profiles. These compositions also had excellent curing properties, and overall good mechanical properties.

TABLE 4

| Compositions: Cure, Mechanical, Rheological, Electrical Properties and Porosity | | | | | | | | | |
|---|---|---|---|---|---|---|---|---|---|
| | Control | C1 | I1 | C2 | I2 | I3 | C3 | C4 | I4 |
| Density (g/cc) | 1.15 | 1.29 | 1.29 | 1.29 | 1.29 | 1.29 | 1.29 | 1.29 | 1.29 |
| Mixer $T_{drop}$ (degC.) | 101 | 91 | 106 | 102 | 103 | 104 | 102 | 105 | 103 |
| ML1 + 4@100° C. (MU) | 45 | 33 | 44 | 44 | 45 | 44 | 44 | 44 | 46 |
| MLRA (MU · s) | 372 | 307 | 354 | 357 | 445 | 410 | 368 | 363 | 314 |
| MLRA/ML | 8.2 | 9.3 | 8 | 8.2 | 9.9 | 9.4 | 8.4 | 8.3 | 6.9 |
| MH-ML | 10.7 | 8.3 | 11.1 | 10.9 | 11.1 | 10.2 | 11.1 | 10.2 | 11.3 |
| MH | 11.6 | 8.8 | 11.9 | 11.7 | 11.9 | 10.9 | 11.9 | 11 | 12.1 |
| ML | 0.9 | 0.5 | 0.8 | 0.8 | 0.8 | 0.7 | 0.8 | 0.8 | 0.8 |
| $t_{90}$ (min) | 1.9 | 2.2 | 2.0 | 2.0 | 1.9 | 2.0 | 2.4 | 1.9 | 2.1 |
| $t_{s2}$ (min) | 0.8 | 1.0 | 0.9 | 0.9 | 0.8 | 0.9 | 0.9 | 0.9 | 0.8 |
| Rheological Ratio (V0.1/V100) | 72 | 62 | 72 | 77 | 66 | 67 | 79 | 76 | 68 |
| V0.1 (Pa · s) | 190159 | 139892 | 186969 | 197481 | 177083 | 177553 | 206354 | 204951 | 191052 |
| V100 (Pa · s) | 2623 | 2240 | 2608 | 2560 | 2671 | 2632 | 2610 | 2686 | 2805 |
| Shore A | 59 | 52 | 59 | 58 | 58 | 58 | 61 | 60 | 61 |
| Volume resistivity ($\Omega$ · cm) | $10^7$ | $10^{10}$ | $10^{12}$ | $10^9$ | $10^{10}$ | $10^{11}$ | $10^{10}$ | $10^9$ | $10^9$ |
| Tensile Strength (MPa) | 8.9 | 7.5 | 7.5 | 8.7 | 7.9 | 7.6 | 8.6 | 8.4 | 7.6 |
| Elongation at Break (%) | 620 | 666 | 670 | 753 | 717 | 731 | 731 | 764 | 641 |
| Trouser Tear Strength (N/mm) | 12 | 6 | 9 | 11 | 11 | 10 | 14 | 13 | 12 |

TABLE 4-continued

Compositions: Cure, Mechanical, Rheological, Electrical Properties and Porosity

|  | Control | C1 | I1 | C2 | I2 | I3 | C3 | C4 | I4 |
|---|---|---|---|---|---|---|---|---|---|
| Compression set (22 h/23° C.) | 10 | 9 | 11 | 13 | 11 | 10 | 11 | 11 | 10 |
| Compression set (22 h/70° C.) | 14 | 15 | 16 | 20 | 16 | 14 | 18 | 17 | 14 |
| Compression set (22 h/100° C.) | 25 | 26 | 31 | 42 | 29 | 30 | 44 | 40 | 25 |
| Porosity | No | Yes | Little | Yes | No | No | Yes | Yes | No |

What is claimed is:

1. A composition comprising the following:
   a) a first ethylene/alpha-olefin/nonconjugated polyene interpolymer that has a Mooney Viscosity from ≥50 to ≤100 and a weight average molecular weight Mw≤250,000 g/mol;
   b) a second ethylene/alpha-olefin/nonconjugated polyene interpolymer that has a Mooney Viscosity from 28 to <50 and a weight average molecular weight Mw≤120,000 g/mol;
   c) a calcined filler formed from a filler composition comprising a kaolinite
   d) carbon black;
   wherein the weight ratio of the carbon black to the calcined filler is ≤1.00 and wherein the composition has a Volume Resistivity ≥1×10$^9$ ohm·cm.

2. The composition of claim 1, wherein the filler composition further comprises a silica.

3. The composition of claim 1, wherein the weight ratio of the calcined filler to the composition is ≥0.10.

4. The composition of claim 1, wherein the calcined filler is surface treated with a composition comprising a mercapto-silane, an alkyl silane, a vinyl silane, an epoxy, or an amino silane.

5. The composition of claim 1, wherein the composition has a Mooney Viscosity (ML1+4, 100° C.)≥20.

6. The composition of claim 1, wherein the composition has a Rheology Ratio (RR)≥40.

7. The composition of claim 1, wherein the first ethylene/alpha-olefin/nonconjugated polyene interpolymer is a first EPDM.

8. The composition of claim 1, wherein the second ethylene/alpha-olefin/nonconjugated polyene interpolymer is a second EPDM.

9. A crosslinked composition formed from the composition of claim 1.

10. An article comprising at least one component formed from the composition of claim 1.

11. The article of claim 10, wherein the article is an extruded article, an injection molded article, or a thermoformed article.

* * * * *